United States Patent Office 3,262,848
Patented July 26, 1966

3,262,848
POULTRY ENTEROHEPATITIS TREATING COMPOSITIONS AND METHODS OF USING SAME
David B. Reisner, Cedar Grove, and Sidney Gister, Bound Brook, N.J., and Howard C. Klein, Brooklyn, N.Y., assignors to Nopco Chemical Company, Newark, N.J., a corporation of New Jersey
No Drawing. Filed Oct. 1, 1962, Ser. No. 227,565
9 Claims. (Cl. 167—53.1)

The present invention relates to veterinary measures. More particularly, the present invention relates to new compositions of matter and a new method for the prevention and control of infectious enterohepatitis (blackhead) in poultry, particularly in turkeys.

Enterohepatitis is an extremely destructive disease occurring in poultry, particularly turkey flocks, and is caused by the protozoan *Histomonas meleagridis*.

Accordingly, it is an object of this invention to provide for new compositions which are effective in controlling, i.e., preventing and treating avian infectious enterohepatitis. Another object of this invention is to provide for a new process for controlling, i.e., preventing and treating avian infectious enterohepatitis. Other objects will be apparent from the detailed description of the invention hereinafter provided.

It has been unexpectedly discovered that the above as well as other objects can be successfully achieved by preparing compositions containing substituted mercapto lower alkanoic acid acyl derivatives of 2-amino-5-nitrothiazole and by administering to poultry, particularly turkeys, substituted mercapto lower alkanoic acid acyl derivatives of 2-amino-5-nitrothiazole. The compositions of this invention are characterized by their high anti-protozoal activity and their low toxicity thus rendering them admirably suitable for treatment of poultry, particularly turkeys.

These derivatives of 2-amino-5-nitrothiazole can be represented by the following formula:

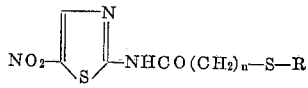

wherein $n$ is an integer, one or two, and R can be a lower alkyl, benzyl, halobenzyl, nitrobenzyl, lower alkyl benzyl, lower alkoxy benzyl, phenyl, halophenyl, nitrophenyl, lower alkyl phenyl or lower alkoxy phenyl substituent. Exemplary of these substituents are methyl, ethyl, propyl, isopropyl, butyl, benzyl, p-chlorobenzyl, o,p-dibromobenzyl, p-nitrobenzyl, p-methyl benzyl, o,p-diethyl benzyl, m-propyl benzyl, p-methoxy benzyl, p-propoxy benzyl, phenyl, p-chlorophenyl, p-bromo phenyl, o,p-dibromophenyl, m-chlorophenyl, p-nitrophenyl, p-methyl phenyl, p-butyl phenyl, o,p-diethyl phenyl, and p-ethoxy phenyl.

Illustrative compounds coming within the scope of our invention are the following:

2-(phenylmercaptoacetamido)-5-nitrothiazole
2-(p-chlorophenyl mercaptoacetamido)-5-nitrothiazole
2-(benzylmercaptoacetamido)-5-nitrothiazole
2-(p-chlorobenzylmercaptoacetamido)-5-nitrothiazole
2-(p-nitrobenzyl mercaptoacetamido)-5-nitrothiazole
2-(n-butyl mercaptoacetamido)-5-nitrothiazole
2-(β-methyl mercaptopropamido)-5-nitrothiazole
2-[β-(p-chlorobenzyl) mercaptopropamido]-5-nitrothiazole The compounds described herein can be prepared by condensing approximately equimolar amounts of 2-amino-5-nitrothiazole with a substituted mercaptoacetyl halide or a substituted mercaptopropionyl halide. The acetyl or propionyl halide is introduced into a mixture of the 2-amino-5-nitrothiazole, a base and a solvent whereupon an exothermic reaction occurs. Useful bases are tertiary organic amine bases such as pyridine or tributylamine and carbonates such as sodium or potassium carbonate. The base is present in amounts sufficient at least to neutralize the acid which is formed during reaction. Useful solvents are acetone, benzene and dimethylformamide. The solvent is present in amounts sufficient at least to disperse the reactants, that is, in amounts to give a workable mixture such as a slurry.

As stated above, these substituted mercapto lower alkanoic acid acyl derivatives of 2-amino-5-nitrothiazole are very useful in the control of avian infectious enterohepatitis, both in the prevention and treatment of the disease. These compounds can be administered to the animals in several ways, the most convenient being the introduction into the feed or drinking water of the animals. The concentration of these compounds in the feed or drinking water can vary depending upon whether the purpose is one of prevention or of treatment and in the case of treatment the severity of infection, age of the animals, etc. In general, a concentration of about 0.005% to about 1.5% by weight of the feed or drinking water of the animals is satisfactory. For prophylactic treatment a concentration of from about 0.02% to about 0.1% by weight of the feed or drinking water is preferred while for therapeutic treatment a concentration of from about 0.025% to about 0.2% by weight of the feed or drinking water is preferred.

EXAMPLE I

In this example, the in vitro activity of the substituted 2-amino-5-nitrothiazoles against *Histomonas meleagridis* is set forth. Several compounds from the prior art are included for comparative purposes. The in vitro activity is expressed as the minimal inhibitory concentration of the compounds tested. Minimal inhibitory concentration, as used herein, is defined as the minimal concentration of an agent which is capable of killing the microorganisms which are present in a culture medium capable alone of supporting a vigorous growth of the microorganisms. In carrying out the determinations, cultures of the above were first prepared and brought into contact with the compounds to be tested as follows.

The test organism, *H. meleagridis*, was obtained from infected ova of the cecal worm, *Heterakis gallinae*, taken from turkeys with blackhead disease. Associated with the protozoan in this culture was an undefined mixed bacterial flora. Balamuth's egg infusion and liver medium enriched with horse serum and rice powder was used to maintain the microorganisms. Transplants were made every second or third day.

Testing was carried out by a tube dilution technique in which each compound was tested at seven levels, i.e., at 100, 50, 25, 10, 5, 1 and 0.1 p.p.m. To test tubes, each containing 4.60 cc. of sterile Balamuth medium were added 0.25 cc. of horse serum, 10 to 20 mg. of rice powder, 0.05 cc. of a 48 or 72 hour culture of *H. meleagridis* and 0.10 cc. of a solution or suspension in 1% methocel of the test compound in an appropriate concentration to give the desired level. After vigorous shaking, the tubes were incubated at 40° C. for 48 or 72 hours. At the end of the incubation period, each tube was examined microscopically for the presence of histomonads and bacteria. The following table summarizes the results of the tests.

TABLE I

| Compound: | Minimal inhibitory concentration (p.p.m.) |
|---|---|
| 2-(n-butylmercaptoacetamido)-5-nitrothiazole | 1.0 |
| 2-(phenylmercaptoacetamido)-5-nitrothiazole | 5.0 |
| 2-(benzylmercaptoacetamido)-5-nitrothiazole | 1.0 |
| 2-(p-chlorobenzylmercaptoacetamido)-5-nitrothiazole | 1.0–5.0 |
| 2-(p-chlorophenylmercaptoacetamido)-5-nitrothiazole | 5.0 |
| 2-($\beta$-methylmercaptopropionamido)-5-nitrothiazole | 1.0 |
| 2-acetomidi-5-nitrothiazole [1] (U.S. Pat. No. 2,531,756) | 1.0–5.0 |
| 3-(5-nitrofurfurylideneamino)-2-oxazolidinone [2] | 10.0 |

[1] Enheptin A (American Cyanamide).
[2] Furazolidone (Norwich Pharm. Co.).

The data in Table I above show that the substituted mercapto lower alkanoic acid acyl derivatives of 2-amino-5-nitrothiazole have high antiprotozoal activity against *H. meleagridis*.

The folowing example demonstrates the extremely low level of toxicity of the compounds utilized herein especially when compared with the 2-acetamido-5-nitrothiazole of U.S. Patent No. 2,531,756.

EXAMPLE II

Acute toxicity tests were performed with mice of the KG1 strain weighing 18 to 22 grams utilizing a standard procedure for obtaining toxicity data. The animal groups at each test level for each compound contained equal numbers of male and female mice. The mice were fasted 18 hours before oral administration of the compound to be tested. The compounds were administered in the form of fine suspensions in 1% methocel. Calculations for the $LD_{50}$ values were performed according to Litchfield and Wilcoxon, J. Pharmacol. 96: 99 (1949). The compounds tested, as well as the data obtained are set forth in the following table.

TABLE II

| Compound | $LD_{50}$ and 19/20 Confidence Limits in mgm./kgm. | Relative Toxicity (2-acetamido-5-nitrothizaole-1) |
|---|---|---|
| 2-(benzylmercaptoacetamido)-5-nitrothiazol | 3,200 (2,462–4,160) | 0.14 |
| 2-($\beta$-methylmercaptopropiona-mido)-5-nitrothiazole | 1,090 (559–2,126) | 0.40 |
| 2-(p-chlorobenzylmercapto-acetamido)-5-nitrothiazole | 2,600 (2,131–3,172) | 0.17 |
| 2-(n-butylmercaptoacetamido)-5-nitrothiazole | 1,650 (1,347–2,021) | 0.27 |
| 2-(phenylmercaptoacetamido)-5-nitrothiazole | 2,000 (1,550–2,580) | 0.22 |
| 2-(p-chlorophenylmercaptoacet-amido)-5-nitrothiazole | 9,100 (6,233–13,290) | 0.05 |
| 2-acetamido-5-nitrothiazole (U.S. Pat. No. 2,531,756) | 438 (368–521) | 1.00 |

As the data in the foregoing example demonstrate, the compounds utilized herein demonstrate far less acute toxicity, particularly when compared with 2-acetomido-5-nitrothiazole of Patent No. 2,531,756. This is shown by the fact that the most toxic of the compounds used herein which was tested demonstrated a toxicity of only 40% of the toxicity deminstrated by 2-actamido-5-nitrothiazole.

Thus, the compositions and process of this invention are admirably suited for both the prevention and control of infectious enterohepatitis in piultry including turkeys in view of their high antiprotozoal activity and low toxicity.

The following example illustrates a preferred manner of carrying out this invention, wherein infectious enterohepatitis in turkeys can be controlled by incorporating a substituted mercapto lower alkanoic acid acyl derivative of 2-amino-5-nitrothiazole into a turkey feed and thereafter feeding the resulting medicated feed to turkeys ad libitum.

EXAMPLE III

To a basal ration containing the following composition is added 0.02% by weight of the total composition of 2 - (benzylmercaptoacetamido)-5-nitrothiazole by simple admixture.

| Ingredients: | lbs. |
|---|---|
| Fine ground yellow corn | 56.48 |
| 44% solvated soybean meal | 26.94 |
| Corn gluten meal | 2.50 |
| Alfalfa meal, 17% dehydrated | 2.00 |
| Stabilized animal fat | 1.50 |
| Fish meal | 4.00 |
| Dried corn distillers' solubles | 1.00 |
| Dried whey (50% delactosed) | 1.00 |
| Dried brewers yeast | 1.50 |
| Iodized salt | 0.40 |
| Calcium carbonate | 1.30 |
| Calcium phosphate | 1.00 |
| Delamix [1] | 0.10 |
| DL-methionine | 0.01 |
| Vitamin A (10,000 I.U./g.) | 0.05 |
| Vitamin $B_{12}$ | 0.020 |
| Vitamin $D_3$ (3,000 I.C.U./g.) | 0.025 |
| Riboflavin | 0.05 |
| DL-calcium pantothenate 45% | 0.001 |
| Niacin | 0.001 |
| Choline chloride 25% | 0.125 |
| | 100.002 |

[1] Delamix is a commercially available trace mineral mix containing 27% calcium, 6% manganese, 2% iron, 0.2% copper, 0.12% iodine, 0.02% cobalt and 0.006% zinc.

The resulting medicated feed is then fed ad libitum to a flock of turkeys.

The remaining examples are directed to the preparation of the substituted mercapto lower alkanoic acid acyl derivatives of 2-amino-5-nitrothiazole which are utilized in the present invention.

EXAMPLE IV 2-(p-nitrobenzylmercaptoacetamido)-5-nitrothiazole

A. PREPARATION OF p-NITROBENZYLACETYL CHLORIDE 47 grams (0.27 mol) of p-nitrobenzyl chloride was dissolved in one liter of ethanol. A solution of 27 grams of thioglycolic acid which had been neutralized with a solution of 50 grams of sodium bicarbonate in 200 ml. of water was then added. The mixture was then heated under reflux for one hour and cooled down to room temperature. No precipitate appeared in the mixture upon cooling and standing at room temperature. The mixture was poured into an equal volume of water whereupon a milky oil appeared. A small amount of a 20% by weight aqueous sodium carbonate solution was added until the pH of the mixture was alkaline. Then about 25 ml. of concentrated hydrochloric acid was added which caused the entire mixture to become strongly acid. After a few minutes, crystals of p-nitrobenzyl mercapto-acetic acid appeared and the precipitation proceeded slowly. The product was filtered and washed with water to give 48 grams of product melting at 105° C. This was 78% of theory.

The 48 grams (0.21 mol) of the crude p-nitrobenzyl mercaptoacetic acid prepared above was added as a powder to 50 ml. of thionyl chloride. There was an immediate evolution of hydrogen chloride gas. The p-nitrobenzyl mercaptoacetic acid slowly dissolved as the mixture was gently warmed. Heating of the resulting light brown liquid was continued at 50° C. while the reaction proceeded and the solution was then allowed to stand at room temperature overnight. Excess thionyl chloride was removed by distillation using a water aspirator thereby leaving a residue of 50 grams of p-nitrobenzyl mercapto acetyl chloride which was used without further purification in the next reaction.

B. PREPARATION OF THE 2-(p-NITROBENZYL MERCAPTOACETAMIDO)-5-NITROTHIAZOLE 40 grams (0.21 mole) of crude p-nitrobenzyl mercapto acetyl chloride prepared above was added during a 10 minute period to a slurry of 20 grams (0.2 mole) of 2-amino-5-nitrothiazole in a mixture of 16 ml. pyridine and 100 ml. acetone. The reaction was strongly exothermic resulting in an increase in temperature from 25° to 60° C. and complete solution of all solids. After standing at room temperature for an additional 10 minutes, the mixture was gently warmed on a steam bath at which point the product suddenly precipitated. The crude product was filtered and washed with acetone. It was then slurried in 20% hydrochloric acid to remove starting compound and then filtered and washed once with dilute hydrochloric acid and twice with water thus yielding 52 grams of product melting at 181–183° C. The yield was 75% of theory. After recrystallization from acetone, the compound melted at 187–188° C.

EXAMPLE V 2-(n-butyl mercaptoacetamido)-5-nitrothiazole

A. PREPARATION OF n-BUTYLMERCAPTOACETYL CHLORIDE 43.2 grams (0.48 mol) of butyl mercaptan dissolved in 200 ml. of a 18% by weight aqueous solution of sodium of sodium hydroxide was added to 41.6 grams (0.44 mole) of chloroacetic acid dissolved in 200 ml. of a 18% by weight aqueous sodium hydroxide solution. The mixture was warmed on a steam bath for 2 hours and then allowed to stand overnight at room temperature. The mixture was acidified with concentrated hydrochloric acid and the resulting oil extracted into ether. The ether was dried and concentrated to give 65 grams of crude n-butyl mercaptoacetic acid.

64 grams of the crude n-butylmercaptoacetic acid prepared above was added dropwise to 78 ml. of thionyl chloride. A vigorous evolution of hydrogen chloride and sulfur dioxide took place almost immediately. After all of the acid had been cautiously added over a 15 minute period, the mixture was heated gently in a bath of warm water until the evolution of gas ceased. The excess thionyl chloride was distilled off using a water aspirator and the resulting n-butyl mercaptoacetyl chloride was distilled under vacuum. The yield was 55 grams of product having a boiling point of 70° to 71° C. at 4 mm.

B. PREPARATION OF THE 2-(n-BUTYL MERCAPTOACETAMIDO)-5-NITROTHIAZOLE 25 grams of n-butylmercaptoacetyl chloride prepared above was added to a slurry of 21.7 grams (0.15 mole) of 2-amino-5-nitrothiazole in 12 ml. of pyridine and 100 ml. of acetone. An extremely vigorous reaction took place. The acetone heated up to its boiling point and a deep red color developed. No solids precipitated after the solution was allowed to cool slowly to room temperature and remain at room temperature for one hour. The mixture was poured into 200 ml. of water with vigorous stirring. The orange precipitate which then occurred was removed by filtration and slurried with 20% hydrochloric acid to remove unreacted 2-amino-5-nitrothiazole and then refiltered. The precipitate was washed with water and air-dried. 40 grams of crude product was recrystallized from an acetone-water mixture to give 20 grams of product melting at 122–123° C. This was then recrystallized from a hexane-acetone mixture to give 12 grams of product melting at 126°–127° C.

EXAMPLE VI 2-(benzylmercaptoacetamido)-5-nitrothiazole

A. PREPARATION OF BENZYLMERCAPTOACETYL CHLORIDE 36 grams of benzylmercaptoacetic acid were added to 50 ml. of thionyl chloride. At first, no visible signs of reaction could be observed but as the acid started to dissolve, hydrogen chloride and sulfur dioxide were given off. After a few minutes, the reaction became slightly exothermic and the rate of gas evolution increased. The mixture was heated on a steam bath for one hour and excess thionyl chloride was removed in vacuo. 100 ml. of benzene was added twice and distilled to remove traces of thionyl chloride. 36 grams of crude benzylmercaptoacetyl chloride remained as the residue.

B. PREPARATION OF 2-(BENZYLMERCAPTOACETAMIDO)-5-NITROTHIAZOLE 21.0 grams (0.1 mole) of the crude benzylmercaptoacetyl chloride prepared above was added to a slurry of 14.5 grams (0.1 mol) of 2-amino-5-nitrothiazole and 9.5 ml. of pyridine in 50 ml. of acetone. All solids dissolved, and the mixture was refluxed for one hour. The acetone solution was poured onto ice and after the ice melted, the yellow solids were removed by filtration, washed with water, 100 ml. of dilute hydrochloric acid (acid to water ratio of 1:1) and then with water. The air-dried solids weighed 24.3 grams and melted at 130–135° C. The solids were recrystallized from a mixture of 300 ml. of ether and 100 ml. of acetone to give a product melting at 152–153° C.

EXAMPLE VII 2-(β-methylmercaptopropionamido)-5-nitrothiazole

A. PREPARATION OF β-METHYLMERCAPTOPROPIONYL CHLORIDE 106 grams (1 mole) of β-mercaptopropionic acid was dissolved in 230 ml. of an aqueous solution containing 43 grams of sodium carbonate. After the evolution of carbon dioxide had ceased, 40 grams (1 mole) of sodium hydroxide was added as pellets, and one mole of methyl iodide then added dropwise over a 30 minute period. The mixture was allowed to stand overnight, then concentrated on a steam bath to a solid, acidified with dilute sulfuric acid and extracted three times with ether. The ether extracts were dried over anhydrous sodium sulfate, filtered, concentrated, and the low boiling material removed by heating to a maximum pot temperature of 100–120° C. at 25 mm. The resulting crude β-methylmercaptopropionic acid 60 grams (0.5 mole) was added dropwise to 70 grams (0.56 mole) of thionyl chloride. A vigorous evolution of gas took place almost immediately and the temperature dropped below room temperature. The mixture was warmed gently on the steam bath for 30 minutes during which time the evolution of gas continued. Low boiling material was removed in vacuo and the product which was distilled at 94–96° C. and 37–38 mm. weighed 45 grams. It was β-methylmercaptopropionyl chloride.

B. PREPARATION OF 2-(β-METHYLMERCAPTOPROPIONAMIDO)-5-NITROTHIAZOLE 19 grams of the β-methylmercaptopropionyl chloride prepared above was added to a slurry of 2-amino-5-nitrothiazole 19 grams (0.13 mole) and 10 ml. of pyridine in 100 ml. of acetone. There was a strong exothermic reaction and all solids dissolved. The mixture was heated gently on steam bath for 30 minutes to complete the reaction. It was cooled to room temperature and crystals formed. The solids were removed, slurried in 20% of dilute hydrochloric acid, filtered and washed with additional acid and then with water. The product weighed 14 grams and melted at 172–174° C. After recrystallization from acetone, it melted at 178–179° C.

EXAMPLE VIII

*2-(p-chlorobenzylmercaptoacetamido)-5-nitrothiazole*

A. PREPARATION OF p-CHLOROBENZYLMERCAPTOACETYL CHLORIDE

A solution of 150 grams of sodium thiosulfate pentahydrate and 240 ml. of water was added to 61 grams of chloroacetic acid which had been neutralized with sodium carbonate to a pH of 6–7. The entire mixture was heated under reflux. A darkening in color occurred after 30 minutes. The mixture was reheated the next day for 3 hours to assure completeness of reaction. Then 350 grams of concentrated hydrochloric acid and 96 grams of p-chlorobenzylchloride were added. This mixture was refluxed 17 hours overnight. The resulting oil was dissolved in ether, washed once with water and then extracted into 400 ml. of an aqueous solution containing 30 grams of sodium hydroxide. The solution was acidified to precipitate an oil which solidified only after decanting and washing several times with water. The yield of p-chloromercaptoacetic acid was 29 grams melting at 51° to 53° C.

29 grams (0.14 mole) of the p-chlorobenzyl mercaptoacetic acid prepared above was added to 36 grams of thionyl chloride. The reaction started slowly with an evolution of gas and an endothermic reaction resulted. When evolution of gas appeared to slacken, the mixture was heated gently. The mixture began to darken slightly upon heating. Excess thionyl chloride was removed and the resulting p-chlorobenzyl mercaptoacetyl chloride was distilled in vacuo, with some decomposition. The product (17.5 grams) was collected at 155–165° C. and 5 mm.

B. PREPARATION OF 2-(p-CHLOROBENZYLMERCAPTOACETAMIDO)-5-NITROTHIAZOLE 8 grams (0.055 mole) of 2-amino-5-nitrothiazole and 4 ml. of pyridine in 50 ml. of acetone were reacted with 17.5 grams (0.075 mole) of p-chlorobenzylmercaptoacetyl chloride prepared above. All solids dissolved in the usual manner but the reaction was not quite as exothermic as usual. The acetone mixture was heated on the steam bath for 30 minutes and then cooled to room temperature. No solids precipitated. The acetone mixture was poured into 150 ml. of water and a gummy yellow solid precipitated. 25 ml. of concentrated hydrochloric acid was added to aid solution of unreacted 2-amino-5-nitrothiazole and the mixture was filtered. The solids were washed with 20% hydrochloric acid and then three times with water. The crude product (20 grams) was recrystallized from 80 ml. of acetone to give 10 grams of product melting at 172–173° C.

EXAMPLE IX

*2-(p-chlorophenylmercaptoacetamido)-5-nitrothiazole*

A. PREPARATION OF p-CHLOROPHENYLMERCAPTOACETYL CHLORIDE

A solution of 98 grams of p-chlorothiophenol and 28 grams of sodium hydroxide and 150 ml. of water was added to a solution of 61.5 grams of chloroacetic acid and 28 grams of sodium hydroxide in 200 ml. of water and the resultant mixture heated on a steam bath for 2 hours. 70 ml. of concentrated hydrochloric acid were added and the solids removed, washed with water and air-dried giving 115 grams of p-chlorophenylmercaptoacetic acid melting at 103–104° C.

61 grams (0.3 mole) of the crude p-chlorophenylmercaptoacetic acid prepared above were added as a powder to 75 ml. of thionyl chloride in a 200 ml. one-neck flask. Gas evolution started slowly and gradually increased as the reaction mixture was gently heated to its reflux temperature. The solids dissolved and the dark brown mixture was refluxed for 30 minutes. Excess thionyl chloride was removed using a water aspirator and the resulting p-chlorophenylmercaptoacetyl chloride was distilled under vacuum at 122–126° C. and 0.3 mm. to give 42 grams (63% yield) of product.

B. PREPARATION OF 2-(p-CHLOROPHENYLMERCAPTOACETAMIDO)-5-NITROTHIAZOLE

The acid chloride prepared above, viz., 42 grams (0.19 mole) was added to a slurry of 28 grams (0.19 mole) of 2-amino-5-nitrothiazole in a mixture of 150 ml. of acetone and 16 ml. of pyridine. An exothermic reaction occurred which raised the temperature of the mixture to the boiling point of the acetone. A yellow solid precipitated upon cooling. This precipitate was filtered and washed with 25 ml. of acetone. The crude product was then slurried in 20% hydrochloric acid and filtered again. After washing three times with water, the air dried product weighed 55 grams. The product was recrystallized from acetone-water to give 30 grams of 2-(p-chlorophenylmercaptoacetamido)-5-nitrothiazole melting at 186° to 189° C.

EXAMPLE X

*2-[β-(p-chlorobenzylmercapto) propionamido]-5-nitrothiazole*

A mixture of 80.5 grams of p-chlorobenzyl chloride and 200 ml. of ethanol was added to an aqueous solution of 53 grams of β-mercaptopropionic acid and sodium bicarbonate in water. The resultant mixture was heated under reflux for 2 hours and then allowed to stand at room temperature overnight. Also was removed in vacuo and the resultant oily residue was acidified with concentrated hydrochloric acid. The oil which crystallized was removed and washed with water. The product which was p-chlorobenzyl mercaptopropionic acid weighed 112 grams and melted at 67° to 69° C.

The p-chlorobenzylmercaptopropionic acid prepared above (44 grams) was converted to the acid chloride with 50 ml. of thionyl chloride. After stripping off excess thionyl chloride, the undistilled acid chloride (40 grams) was reacted with 27 grams of 2-amino-5-nitrothiazole in acetone and pyridine as described in Example IX. The product which was 2-[β-(p-chlorobenzylmercapto)propamido]-5-nitrothiazole after two recrystallizations from isopropanolacetone weighed 82 grams and melted at 183–184° C.

EXAMPLE XI

*2-(phenylmercaptoacetamido)-5-nitrothiazole*

Following the procedure described in Example IX, 100 grams of thiophenol and 85 grams of chloroacetic acid were converted to phenylmercaptoacetic acid (150 grams) melting at 62–63° C. The corresponding acid chloride (B.P. 98° C. at 2 mm.) was then prepared from 67.2 grams of the phenylmercaptoacetic acid and thionyl chloride. Finally, 37.2 grams of the resulting phenylmercaptoacetyl chloride and 29 grams of 2-amino-5-nitrothiazole were reacted in the presence of acetone and pyridine to yield 2-(phenylmercaptoacetamido)-5-nitrothiazole. Its melting point which was 133–139° C. was raised to 147–149° C. after recrystallization from aqueous acetone followed by a recrystallization from isopropanol.

EXAMPLE XII

*2-(benzylmercaptoacetamido)-5-nitrothiazole*

A mixture of 10.2 grams of benzylmercaptoacetyl chloride (B.P. 135° C. at 6–7 mm.), 7.8 grams of 2-amino-5-nitrothiazole, 50 ml. of acetone, and 9.0 grams of tri-n-butylamine was heated under reflux for one hour and then allowed to cool to room temperature. After standing overnight, the resulting reaction mixture was poured onto ice. The solid was removed by filtration, slurried in 20% hydrochloric acid, filtered again and washed with water. After recrystallization from a mixture of ethanol and acetone, this material which was 2-(benzylmercaptoacetamido)-5-nitrothiazole melted at 154–155° C.

EXAMPLE XIII

2-(benzylmercaptoacetamido)-5-nitrothiazole

A mixture of 10.2 grams of benzylmercaptoacetyl chloride, 7.8 grams of 2-amino-5-nitrothiazole, 50 ml. of benzene and 4.0 grams of pyridine was heated under reflux for one hour. Benzene was evaporated leaving a brown oil, which after treatment with water and hydrochloric acid as in the preceding example gave 15 grams of a crude product which was 2-(benzylmercaptoacetamido)-5-nitrothiazole melting at 149–151° C.

EXAMPLE XIV

2-(benzylmercaptoacetamido)-5-nitrothiazole

A mixture of 10.2 grams of benzylmercaptoacetyl chloride, 7.8 grams of 2-amino-5-nitrothiazole, 50 ml. of acetone, and 5.3 grams of sodium carbonate was stirred and heated under reflux for one hour. After refluxing, the mixture was poured into ice water giving a vigorous evolution of carbon dioxide. The solid was removed by filtration, washed with 20% hydrochloric acid and then with water and finally air-dried. The product, 2-(benzylmercaptoacetamido)-5-nitrothiazole, weighed 6 grams and melted at 153–154° C.

Having described our invention, what we claim as new and desire to secure by Letters Patent is:

1. A composition comprising turkey feed and at least one compound of the formula

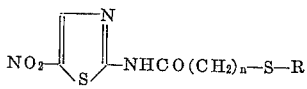

wherein $n$ is an integer selected from the group consisting of 1 and 2, and R is selected from the group consisting of lower alkyl, benzyl, halobenzyl, nitrobenzyl, lower alkyl benzyl, lower alkoxy benzyl, phenyl, halophenyl, nitrophenyl, lower alkyl phenyl and lower alkoxy phenyl, said compound being present in an amount sufficient to control enterohepatitis.

2. A process for controlling infectious enterohepatitis in poultry which comprises orally administering to poultry at least one compound of the formula

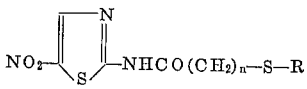

wherein $n$ is an integer selected from the group consisting of 1 and 2, and R is selected from the group consisting of lower alkyl, benzyl, halobenzyl, nitrobenzyl, lower alkyl benzyl, lower alkoxy benzyl, phenyl, halophenyl, nitrophenyl, lower alkyl phenyl and lower alkoxy phenyl, said compound being sufficient to control said infectious enterohepatitis.

3. A process for controlling infectious enterohepatitis in poultry which comprises orally administering to poultry a member of the group consisting of poultry feed and water and at least one compound of the formula

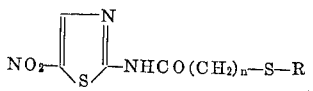

wherein $n$ is an integer selected from the group consisting of 1 and 2, and R is selected from the group consisting of lower alkyl, benzyl, halobenzyl, nitrobenzyl, lower alkyl benzyl, lower alkoxy benzyl, phenyl, halophenyl, nitrophenyl, lower alkyl phenyl and lower alkoxy phenyl, said compound being sufficient to control said infectious enterohepatitis.

4. The process of claim 3 in which said compound is present in amounts of from about 0.005% to about 1.5% by weight of said feed and water.

5. The process of claim 4 in which said compound is 2-(p-chlorobenzylmercaptoacetamido)-5-nitrothiazole.

6. The process of claim 4 in which said compound is 2-(n-butylmercaptoacetamido)-5-nitrothiazole.

7. The process of claim 4 in which said compound is 2-(benzylmercaptoacetamido)-5-nitrothiazole.

8. The process of claim 4 in which said compound is 2-(β-methylmercaptopropionamido)-5-nitrothiazole.

9. A process for controlling enterohepatitis in turkeys which comprises orally administering to turkeys a member of the group consisting of turkey feed and water and at least one compound of the formula

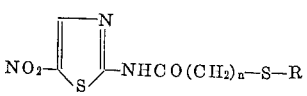

wherein $n$ is an integer selected from the group consisting of 1 and 2, and R is selected from the group consisting of lower alkyl, benzyl, halobenzyl, nitrobenzyl, lower alkyl benzyl, lower alkoxy benzyl, phenyl, halophenyl, nitrophenyl, lower alkyl phenyl and lower alkoxy phenyl, said compound being present in an amount sufficient to control enterohepatitis.

References Cited by the Examiner

UNITED STATES PATENTS 3,124,588    3/1964    Reisner _____ 260—306.8

JULIAN S. LEVITT, *Primary Examiner.*

FRANK CACCIAPAGLIA, JR., *Examiner.*

SAM ROSEN, *Assistant Examiner.*